United States Patent [19]
Scalabrin

[11] 3,949,781
[45] Apr. 13, 1976

[54] EXHAUST VALVE

[75] Inventor: Domingos Scalabrin, Sao Paulo, Brazil

[73] Assignee: Alcan Aluminio Do Brasil S.A., Brazil

[22] Filed: July 5, 1974

[21] Appl. No.: 486,068

[30] Foreign Application Priority Data
Aug. 9, 1973  Brazil .................................. 006085

[52] U.S. Cl. .............................. 137/532; 220/203
[51] Int. Cl.² ....................................... F16K 15/00
[58] Field of Search .............. 137/532, 533, 533.27; 220/203

[56] References Cited
UNITED STATES PATENTS
2,554,931  5/1951  Welden .............................. 220/203
2,633,870  4/1953  Lind ................................ 220/203 X FOREIGN PATENTS OR APPLICATIONS
569,892  11/1957  Italy ..................................... 137/532
143,867  2/1950  Australia ............................. 137/532

Primary Examiner—Robert G. Nilson
Attorney, Agent, or Firm—McGlew and Tuttle

[57] ABSTRACT

An exhaust valve, in pressure cooker lids, comprises a vertical tube on which a suitable weight is applied provided with several steam exhaust points which is provided on its free edge with an external thread where the weight is screwed, leaving a free internal space forming a chamber into which the exhaust holes for the steam open, and having on the upper part, a coaxial projection which may penetrate into the internal part of the exhaust or exit tube of the valve.

2 Claims, 3 Drawing Figures

EXHAUST VALVE

BACKGROUND OF THE INVENTION

1. FIELD OF THE INVENTION

This invention refers to improvements introduced in or relating to an exhaust valve used in pressure cookers.

2. DESCRIPTION OF THE PRIOR ART

The usual and known pressure cookers are provided, in their upper part, with an exhaust valve comprising a vertical tube of steam exhaust, an enveloping or surrounding weight of said tube, provided with exhaust points, such weight plugging partially, and by simple adhesion, the exhaust nozzle of said tube. When the internal pressure reaches limits higher than that corresponding to the pressure exerted by the weight, the latter is lifted by the internal pressure leaving the exhaustion of part of the steam until reaching a point in which the pressure of the weight is greater than said internal pressure, in such a way that the valve returns back fitting on the tube nozzle of exhaust. Additionally, such weight provided with exhausts for the outside usually comprises a cylinder or equivalent, provided with an axial hole, not piercing through, and is of a diameter slightly larger than the external diameter of the exhaust tube. In other words, said tube covers the exhaust tube easily and because of its perforations, it allows the escape of steam originating from the exhaust tube in jets, subdividing the vertical central jet in order to prevent the formation of a single jet of higher strength and of the greater possibility of burning a person who may be close to the pressure cooker. On the other hand, as it has been explained, the exhaust tube is a vertical tube situated on the lid of the pressure cooker and establishes a connection between the internal part of the cooker and the outside. In order for the steam to escape through the exhaust tube without entraining food particles, mainly the cellulosic envelope of cereal grains, the exhaust tube is provided, in the part which lies in the internal part of the cooker, with orthogonal perforations, in relation to the tube axis, made in the fitting nut of said tube.

Normally, when the cooking of cereals in grain is made, principally lentils and even beans, there frequently occurs the loosening of their skin which are entrained by the steam and, due to the fact that they are too thin, they clog the exhaust tube, thus causing a very great pressure buildup for clearing the exhaust valve causing a violent ejection of the weight to attain great heights.

SUMMARY OF THE INVENTION

The present invention is aimed at the solution of such problems mentioned above through a better fitting of the weight of the nozzle of the exhaust tube, and a constructive disposition of said exhaust tube and of the weight, in order to prevent possible cloggings.

It is an object of the invention to provide an improved exhaust valve of the type used on lids of pressure cookers, comprising a vertical tube tightly fitted in the lid and projecting vertically therefrom and a suitable weight mounted on the tube for vertical displacement by means of a blind hole extending from the lower end of the weight upwardly and enlarged into an elongated chamber having a bottom surface and communicating with the outside through a plurality of substantially radially extending exhaust ports, the tube being provided, at its upper orifice, with an external thread, the blind hole of the weight being provided, at its lower end, with an internal thread engageable with the external thread of the tube, and the bottom surface of the elongated chamber being adapted to close the upper orifice of the tube.

Another object of the invention is to provide the bottom surface of the elongated chamber with a needle-shaped projection or the like and the upper orifice of the tube with a conformable seat for receiving the projection and thereby tightly closing the orifice.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
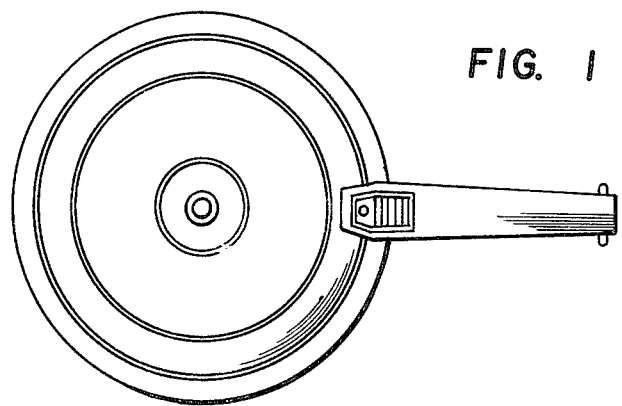
FIG. 1 illustrates a view of high plan of a cooker, or more particularly, the lid of a pressure cooker.
Figure 2:
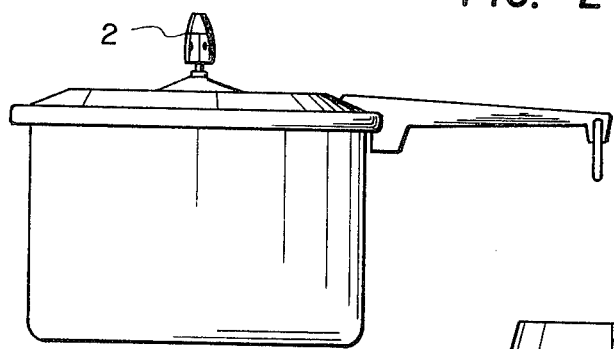
FIG. 2 illustrates a side view of FIG. 1.
Figure 3:
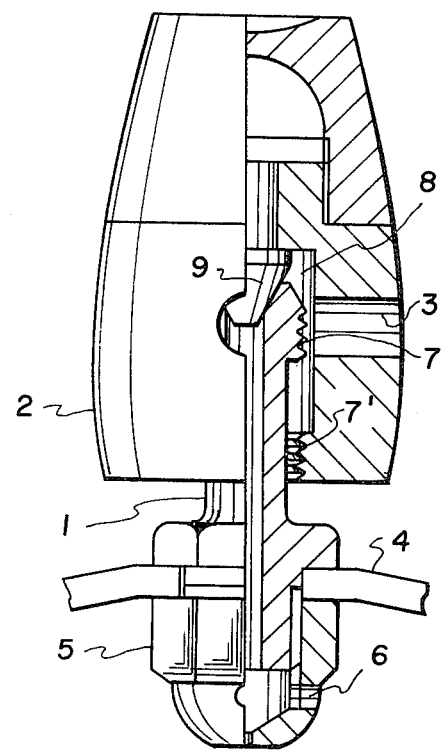
FIG. 3 illustrates a weight/valve, with a partial section for a better understanding of its constructive disposition.

The purpose of the present invention is to provide improvements in, or relating to, the exhaust valve in pressure cooker lids, comprising a vertical tube 1 on which a weight 2 is applied of a suitable nature provided with several steam exhaust openings 3, characterized by the fact that tube 1 is suitably fitted to the lid 4 through a nut 5 provided with numerous holes for the steam passage 6, and provided at its free edge with an external thread where the weight 2 is screwed through a threaded screw 7 located at its lower edge, leaving a free internal space in continuation, such space being formed by a chamber 8 where the piercing holes open 3, either orthogonal or not, of the steam exhaust, and having in the upper part thereof, a coaxial projection having the shape of a needle 9 or equivalent, which may be introduced in the internal part of the exhaust tube of the valve.

Operation: When there is an internal pressure in the cooker, and the same attains a certain limit, the steam pressures the weight 2, thus causing the needle 9 to be dislodged from the edge of tube 1 thus letting the passage of the steam through the holes or openings 3.

While a specific embodiment of the invention has been shown and described in detail to illustrate the application of the principles of the invention, it will be understood that the invention may be embodied otherwise without departing from such principles.

What is claimed is:

1. In an exhaust valve of the type used in the lids of pressure cookers, including a vertical exhaust tube on which a suitable weight is mounted provided with an exhaust port, the improvement that said tube, having an upper orifice and a lower end, is fitted in said lid by means of a nut, provided adjacent its upper orifice, with an external thread and, adjacent its lower end, with a steam passage, and that said weight is formed with a threaded hole adapted to engage with said external thread of said tube and further formed with an elongated chamber extending vertically in continuation of said threaded hole and terminating by a bottom surface and adapted to receive with play said upper threaded portion of said tube and close the same by means of said bottom surface, said exhaust port connecting said chamber with the outside.

2. An exhaust valve, as claimed in claim 1, wherein said bottom surface is formed with a needle-shaped projection or the like extending coaxially of said tube orifice and said tube orifice is formed with a conformable seat for engaging with said projection to close said orifice.

* * * * *